US012462115B2

(12) United States Patent
Tumuluri

(10) Patent No.: US 12,462,115 B2
(45) Date of Patent: *Nov. 4, 2025

(54) SYSTEM AND METHOD FOR TEMPORAL ATTENTION BEHAVIORAL ANALYSIS OF MULTI-MODAL CONVERSATIONS IN A QUESTION AND ANSWER SYSTEM

(71) Applicant: Openstream Inc., Bridgewater, NJ (US)

(72) Inventor: Rajasekhar Tumuluri, Bridgewater, NJ (US)

(73) Assignee: Openstream Inc., Bridgewater, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/448,228

(22) Filed: Aug. 11, 2023

(65) Prior Publication Data

US 2023/0385560 A1    Nov. 30, 2023

Related U.S. Application Data

(63) Continuation of application No. 17/103,460, filed on Nov. 24, 2020, now Pat. No. 11,769,018.

(51) Int. Cl.
G06F 40/35      (2020.01)
G06F 16/9032    (2019.01)
(Continued)

(52) U.S. Cl.
CPC ........ *G06F 40/56* (2020.01); *G06F 16/90328* (2019.01); *G06F 16/90332* (2019.01);
(Continued)

(58) Field of Classification Search
CPC .... G06F 16/3329; G06F 3/167; G06F 16/532; G06F 16/90332; G06F 18/2113;
(Continued)

(56) References Cited

U.S. PATENT DOCUMENTS 6,964,023 B2   11/2005   Maes et al.
8,000,973 B2    8/2011   Williams et al.
(Continued)

OTHER PUBLICATIONS

Xie et al, "Improving web image search with contextual information", In Proceedings of the 28th ACM international conference on information and knowledge management Nov. 3, 2019 (pp. 1683-1692). (Year: 2019).*

(Continued)

*Primary Examiner* — Olujimi A Adesanya
(74) *Attorney, Agent, or Firm* — Young Basile Hanlon & MacFarlane, P.C.

(57) ABSTRACT

Methods and systems for processing a multi-modal conversation are disclosed. A multi-modality input is selected from a plurality of multimodality conversations among two or more users. The system annotates the first modality inputs and at least one attention region in the first modality input corresponding to a set of entities and semantic relationships in a unified modality is identified by a discrete aspect of information bounded by the attention elements. The system models the representations of the multimodality inputs at different levels of granularity, which includes entity level, turn level, conversational level. The method proposed uses a network that consists of multilevel encoder-decoder architecture that is used to determine unified focalized attention, analyze and construct one or more responses for one or more turns in a conversation.

19 Claims, 9 Drawing Sheets

(51) Int. Cl.
  *G06F 16/906*   (2019.01)
  *G06F 40/56*    (2020.01)
  *G06N 3/04*     (2023.01)
  *G06N 5/04*     (2023.01)

(52) U.S. Cl.
  CPC ............. *G06F 16/906* (2019.01); *G06N 3/04* (2013.01); *G06N 5/04* (2013.01)

(58) Field of Classification Search
  CPC ........ G06F 18/253; G06F 16/53; G06F 18/24; G06F 40/30; G06F 16/5846; G06F 16/332
  See application file for complete search history.

(56) References Cited

U.S. PATENT DOCUMENTS

| | | | | |
|---|---|---|---|---|
| 9,037,580 | B2* | 5/2015 | Brown | G06F 16/3329 706/14 |
| 9,916,301 | B2* | 3/2018 | Hillard | G06F 40/295 |
| 9,965,705 | B2 | 5/2018 | Chen et al. | |
| 11,314,800 | B2 | 4/2022 | Huang et al. | |
| 11,461,681 | B2 | 10/2022 | Tumuluri | |
| 11,769,018 | B2* | 9/2023 | Tumuluri | G06F 40/30 704/9 |
| 2008/0091406 | A1 | 4/2008 | Baldwin et al. | |
| 2009/0100053 | A1 | 4/2009 | Boschee et al. | |
| 2009/0287678 | A1* | 11/2009 | Brown | G06F 16/3344 707/999.005 |
| 2011/0231182 | A1 | 9/2011 | Weider et al. | |
| 2016/0132773 | A1 | 5/2016 | Chandrasekaran et al. | |
| 2019/0340200 | A1* | 11/2019 | Coimbra | G10L 15/22 |
| 2020/0097496 | A1* | 3/2020 | Alexander | G06F 16/355 |
| 2020/0242152 | A1* | 7/2020 | Huang | G06F 16/3329 |
| 2020/0410012 | A1* | 12/2020 | Moon | G06Q 10/04 |
| 2021/0056445 | A1* | 2/2021 | Wu | G06N 5/04 |
| 2021/0065683 | A1* | 3/2021 | Meng | G10L 15/063 |
| 2021/0082398 | A1* | 3/2021 | Hori | G10L 15/02 |
| 2021/0117479 | A1 | 4/2021 | Liu et al. | |
| 2021/0217408 | A1* | 7/2021 | Hakkani-Tur | G06F 40/284 |
| 2021/0248375 | A1 | 8/2021 | Geng et al. | |
| 2021/0248376 | A1* | 8/2021 | Zhao | G06V 20/49 |
| 2021/0334300 | A1* | 10/2021 | Banda | G06N 3/08 |
| 2021/0406592 | A1 | 12/2021 | Li et al. | |
| 2022/0038397 | A1* | 2/2022 | Yuan | H04L 51/02 |

OTHER PUBLICATIONS

Luong et al. "Effective Approaches to Attention-based Neural Machine Translation" Computer Science Department, Stanford University, ar.XIV:1508.04025v5, Sep. 20, 2015.
Bahdanau et al. "Neural Machine Translation by Jointly Learning to Align and Translate" ICLR, arXiv:1409.0473v7, May 19, 2016.
Gabriel Loye "Attention Mechanism" Floydhub, Deep Learning, Sep. 15, 2019, https://blog.floydhub.com/attention-mechanism/.

* cited by examiner

SYSTEM AND METHOD FOR TEMPORAL ATTENTION BEHAVIORAL ANALYSIS OF MULTI-MODAL CONVERSATIONS IN A QUESTION AND ANSWER SYSTEM

CROSS REFERENCE TO RELATED APPLICATION

This application is a continuation of U.S. patent application Ser. No. 17/103,460, filed on Nov. 24, 2020, of which is incorporated herein by reference.

BACKGROUND

Question answering in long conversations is a challenging problem in multi-modal conversational artificial intelligence (AI), which generates a natural answer from the referenced multiple modality content based on the question. Architectures that are based on uni-modal applications are inefficient to capture and recognize sequential and temporal attentions in the long conversations. A need exists for a sequential-temporal encoder-decoder model for attention analysis in multi-modality conversations. It would also be desirable for these systems to implement unified representations that are learned based on soft and hard attentions.

SUMMARY

In an aspect, a method for processing a multi-modal conversation may include receiving sensor data from one or more sensors. The sensor data may include a user request. The user request may include multiple mode inputs. The multiple mode inputs may be associated with the one or more sensors. The user request may include a portion of a conversation. The method may include extracting one or more entities. The one or more entities may be extracted in real-time. The one or more entities may be extracted from the multiple mode inputs. The method may include determining one or more semantic relationships between the one or more entities. The method may include determining one or more attentions in the conversation. The method may include generating a query. The query may be generated based on the one or more attentions. The method may include transforming the query into one or more candidate queries. The method may include executing the one or more candidate queries against a respective data store, a respective application, or both, to generate one or more candidate responses. The method may include concatenating the one or more candidate responses to generate a response. The response may be generated based on the semantic relationships. The method may include displaying the response in an interactive dashboard.

In an aspect, a computing apparatus may include a processor, one or more sensors, and a memory. The one or more sensors may be configured to obtain sensor data. The sensor data may include a user request in multiple mode inputs associated with the one or more sensors. The user request may include a portion of a conversation. The memory may be configured to store instructions, that when executed by the processor, cause the processor to extract one or more entities from the multiple mode inputs. The one or more entities may be extracted in real-time. The processor may be configured to determine one or more semantic relationships between the one or more entities. The processor may be configured to determine one or more attentions in the conversation. The processor may be configured to generate a query based on the one or more attentions. The processor may be configured to transform the query into one or more candidate queries. The processor may be configured to execute the one or more candidate queries against a respective data store, a respective application, or both, to generate one or more candidate responses. The processor may be configured to concatenate the one or more candidate responses to generate a response. The response may be generated based on the semantic relationships. The computing device may include a display configured to display the response on an interactive dashboard.

In an aspect, a system may include one or more sensors, a processor, a display, and a memory. The one or more sensors may be configured to obtain sensor data. The sensor data may include a user request in multiple mode inputs associated with the one or more sensors. The user request may include a portion of a conversation. The memory may be configured to store instructions, that when executed by the processor, cause the processor to extract one or more entities from the multiple mode inputs. The one or more entities may be extracted in real-time. The processor may be configured to determine one or more semantic relationships between the one or more entities. The processor may be configured to determine one or more attentions in the conversation. The processor may be configured to generate a query based on the one or more attentions. The processor may be configured to transform the query into one or more candidate queries. The processor may be configured to execute the one or more candidate queries against a respective data store, a respective application, or both, to generate one or more candidate responses. The processor may be configured to concatenate the one or more candidate responses to generate a response. The response may be generated based on the semantic relationships. The system may be configured to display the response on an interactive dashboard on the display.

In an aspect, a method for processing a multi-modal conversation may include receiving sensor data from a plurality of sensors. The sensor data may include a user request in multiple mode inputs associated with the plurality of sensors. The user request may include a portion of a conversation. The method may include vectorizing and embedding the multiple mode inputs with contextual data. The method may include concatenating the vectorized multiple mode inputs in a prescribed format. The method may include determining, based on the concatenated and vectorized multiple mode inputs, an attention in the conversation. The method may include extracting one or more hard-attentions and one or more soft-attentions from the attention. The method may include weighting, based on the one or more hard-attentions and the one or more soft-attentions, portions of the multiple mode inputs to determine a meaning of an input query. The method may include generating the input query at least based on the weighted portions of the multiple mode inputs. The method may include generating a response based on the input query.

In an aspect, a computing apparatus may include a processor, a plurality of sensors, and a memory. The plurality of sensors may be configured to obtain sensor data. The sensor data may include a user request in multiple mode inputs associated with the plurality of sensors. The user request may include a portion of a conversation. The memory may be configured to store instructions that, when executed by the processor, cause the computing apparatus to: receive the sensor data from the plurality of sensors; vectorize and embed the multiple mode inputs with contextual data; concatenate the vectorized multiple mode inputs in a prescribed format; determine, based on the concatenated and vectorized multiple mode inputs, an attention in the conversation; extract one or more hard-attentions and one or more soft-attentions from the attention; weigh, based on the one or more hard-attentions and the one or more soft-attentions, portions of the multiple mode inputs to determine a meaning of an input query; generate the input query at least based on the weighted portions of the multiple mode inputs; and generate a response based on the input query.

In an aspect, a system may include a plurality of sensors and a processor. The plurality of sensors may be configured to obtain sensor data. The sensor data may include a user request in multiple mode inputs associated with the plurality of sensors. The user request may include a portion of a conversation. The processor may be configured to: receive the sensor data from the plurality of sensors; vectorize and embed the multiple mode inputs with contextual data; concatenate the vectorized multiple mode inputs in a prescribed format; determine, based on the concatenated and vectorized multiple mode inputs, an attention in the conversation; extract one or more hard-attentions and one or more soft-attentions from the attention; weigh, based on the one or more hard-attentions and the one or more soft-attentions, portions of the multiple mode inputs to determine a meaning of an input query; generate the input query at least based on the weighted portions of the multiple mode inputs; and generate a response based on the input query.

BRIEF DESCRIPTION OF DRAWINGS

The various embodiments of the disclosure will hereinafter be described in conjunction with the appended drawings, provided to illustrate, and not to limit, the disclosure, wherein like designations denote like elements, and in which.

DETAILED DESCRIPTION

Figure 1:
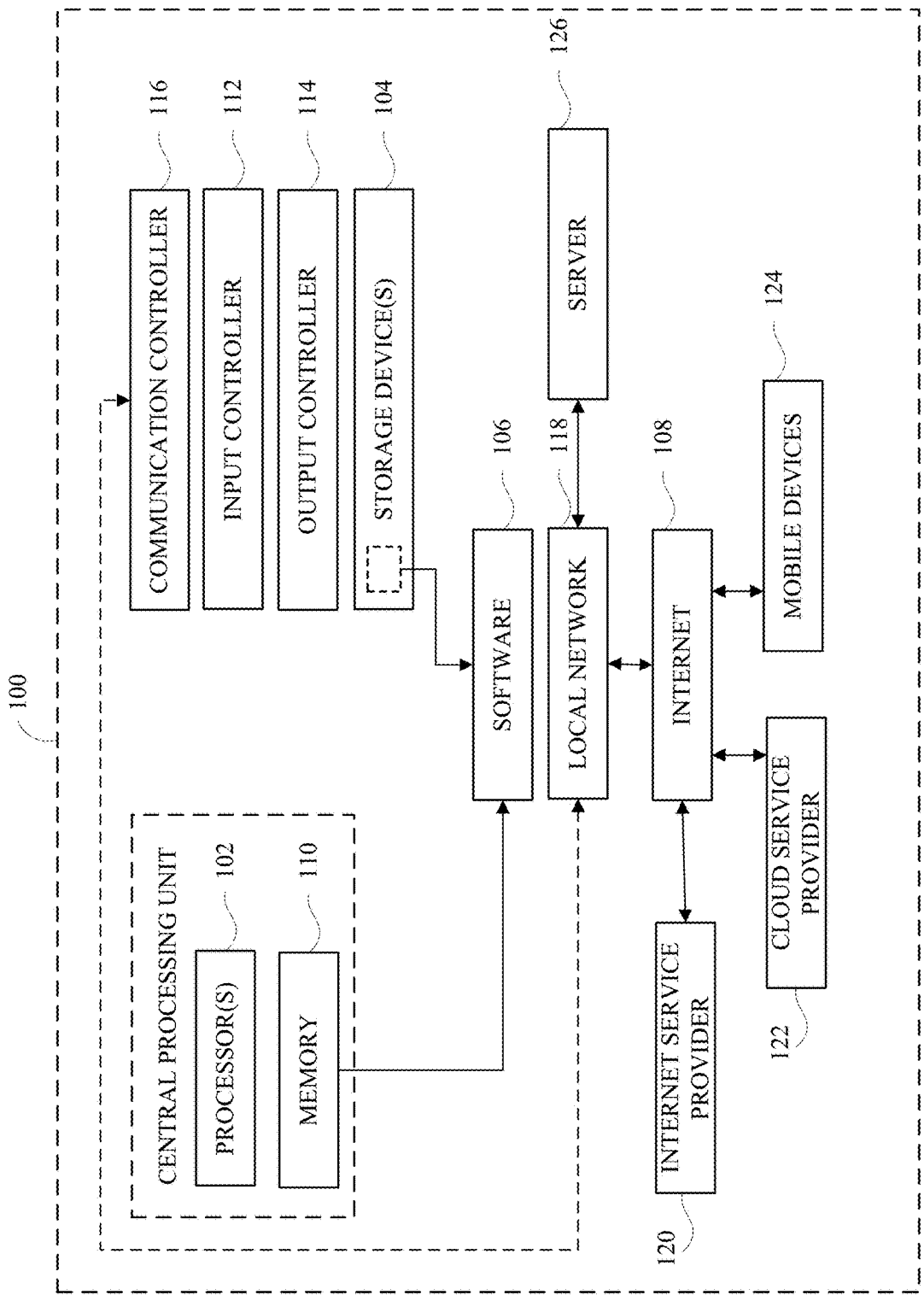
FIG. 1 is a block diagram of an example of a computing device in accordance with embodiments of this disclosure.

In the disclosed embodiments, an attention discovery approach for generating automatic responses in a conversation that includes one or more multi-modality inputs is described. Throughout this application, multi-modality inputs may also be referred to as multiple mode inputs. The multi-modality inputs include multi-modality content. The embodiments described herein are configured to provide convenience to the users to interact with the system in a natural way, for example through speech (i.e., voice input), texting (i.e., text input), touch or gesture input, image input, object drawing input, scanned object input, motion input, location input, or any combination thereof. The systems described herein may be configured to detect and localize the modality-event-context patterns by analyzing the multi-modality inputs given by a specific user. In one approach, heuristics methods may be used to mine the relationship between different modality inputs. Another approach may use natural language processing, computer vision, and machine learning approaches to discover the intent of user requests and focus of the query to access and retrieve the information from one or more enterprise applications and various data stores.

A system for attention discovery may be configured to determine hard attentions and soft attentions in a conversational query with the help of semantic relationships among the attentional elements. The system may generate call-action-inference patterns, which provides the corresponding data sources from where the response can be prepared. In one approach, a semantic equivalence relation may be used to identify the semantic relationships between different modality inputs, and another approach may use computational language, computer vision, speech processing and machine learning approaches to discover the attention of a user query.

The system may be configured to model the representations of the multimodality inputs and the context at different levels of granularity. For example, the levels of granularity may include entity level, turn level, and conversational level. An entity level may refer to any parameter, for example, product A to product B. Turn level may refer to at what turn was something asked, for example, something that was asked currently or previously (i.e., temporal context). Conversational level may refer to the discourse, for example, what the conversation is about. The system may include contextual embeddings of the inputs and use a horizontal bi-directional attention flow (i.e., horizontal; intra-query sequential attention embeddings) to develop a query-attention-aware multi-modality representation of one or more multi-modality inputs. The system may also use a vertical bi-directional attention flow and include or augment inter-query temporal attention embeddings. The system may be implemented using a network that includes a multilevel encoder-decoder architecture that is used to determine a unified focalized attention, analyze one or more candidate responses, and construct one or more responses for one or more turns in a conversation.

While the embodiments described herein may be susceptible to various modifications and alternative forms, specific embodiments thereof are shown by way of example in the drawings and will be described in detail below. It should be understood, however that these examples not intended to limit the embodiments to the particular forms disclosed, but on the contrary, the disclosed embodiments cover all modifications, equivalents, and alternatives falling within the spirit and the scope of the disclosure as defined by the appended claims.

The method steps have been represented, wherever appropriate, by conventional symbols in the drawings, showing those specific details that are pertinent to understanding the embodiments so as not to obscure the disclosure with details that will be readily apparent to those of ordinary skill in the art having benefit of the description herein.

The terms "comprises," "comprising," or any other variations thereof, are intended to cover a non-exclusive inclusion, such that a process, method that comprises a list of steps does not include only those steps but may include other steps not expressly listed or inherent to such process or method. Similarly, one or more elements in a system or apparatus proceeded by "comprises . . . a" does not, without more constraints, preclude the existence of other elements or additional elements in the system or apparatus.

The features of the present embodiments are set forth with particularity in the appended claims. Each embodiment itself, together with further features and attended advantages, will become apparent from consideration of the following detailed description, taken in conjunction with the accompanying drawings.

The disclosed embodiments describe retrieving and organizing information from a set of applications, data sources, or both, by performing various steps as is described in details in forthcoming sections. For the sake explanation and understanding, reference is drawn towards a typical search query where the process heavily relies on multi-modality technology for converging speech, text, images, touch, language, and the like. Success of such a multi-modality platform mainly depends on how good and relevant the obtained results are.

In reference to the above, a user query may have one or more modalities such as speech, text, images, scanned objects, touch, or the like. From a technical point of view, these inputs may be obtained from one or more sensors and can be seen as analogous to sensor data.

FIG. 1 is a block diagram of a system that comprises a computing device 100 to which the present disclosure may be applied according to an embodiment of the present disclosure. The system includes at least one processor 102, designed to process instructions, for example computer readable instructions (i.e., code) stored on a storage device 104. By processing instructions, processor 102 may perform the steps and functions disclosed herein. Storage device 104 may be any type of storage device, for example, but not limited to an optical storage device, a magnetic storage device, a solid-state storage device, or a non-transitory storage device. The storage device 104 may contain software 106 which may include a set of instructions (i.e. code). Alternatively, instructions may be stored in one or more remote storage devices, for example storage devices accessed over a network or the internet 108. The computing device 100 also includes an operating system and microinstruction code. The various processes and functions described herein may either be part of the microinstruction code, part of the program, or a combination thereof, which is executed via the operating system. Computing device 100 additionally may have memory 110, an input controller 112, and an output controller 114 and communication controller 116. A bus (not shown) may operatively couple components of computing device 100, including processor 102, memory 110, storage device 104, input controller 112, output controller 114, and any other devices (e.g., network controllers, sound controllers, etc.). Output controller 114 may be operatively coupled (e.g., via a wired or wireless connection) to a display device such that output controller 114 is configured to transform the display on display device (e.g., in response to modules executed). Examples of a display device include, and are not limited to a monitor, television, mobile device screen, or touch-display. Input controller 112 may be operatively coupled via a wired or wireless connection to an input device such as a mouse, keyboard, touch pad, scanner, scroll-ball, or touch-display, for example. The input device is configured to receive input from a user and transmit the received input to the computing device 100 vial the input controller 112. The communication controller 116 is coupled to a bus (not shown) and provides a two-way coupling through a network link to the internet 108 that is connected to a local network 118 and operated by an internet service provider (ISP) 120 which provides data communication services to the internet 108. A network link may provide data communication through one or more networks to other data devices. For example, a network link may provide a connection through local network 118 to a host computer, to data equipment operated by the ISP 120. A cloud service provider 122 and mobile devices 124 provides data store and transfer services to other devices through internet 108. A server 126 may transmit a requested code for an application through internet 108, ISP 120, local network 118 and communication controller 116. FIG. 1 illustrates computing device 100 with all components as separate devices for ease of identification only. Each of the components shown in FIG. 1 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 100 may be implemented as one or more servers, for example a farm of networked servers, a clustered server environment, or a cloud network of computing devices.

An embodiment describes a method of multi-modality attention discovery for effective question and answer via a conversational virtual assistant tool. A user provides a set of inputs. These inputs may be provided by the user through a multi-modal interface-based computer-implemented tool. These inputs are, but not limited to, images, speech, audio, text, facial expressions, body language, touch, scanned object, and video.

Figure 2:
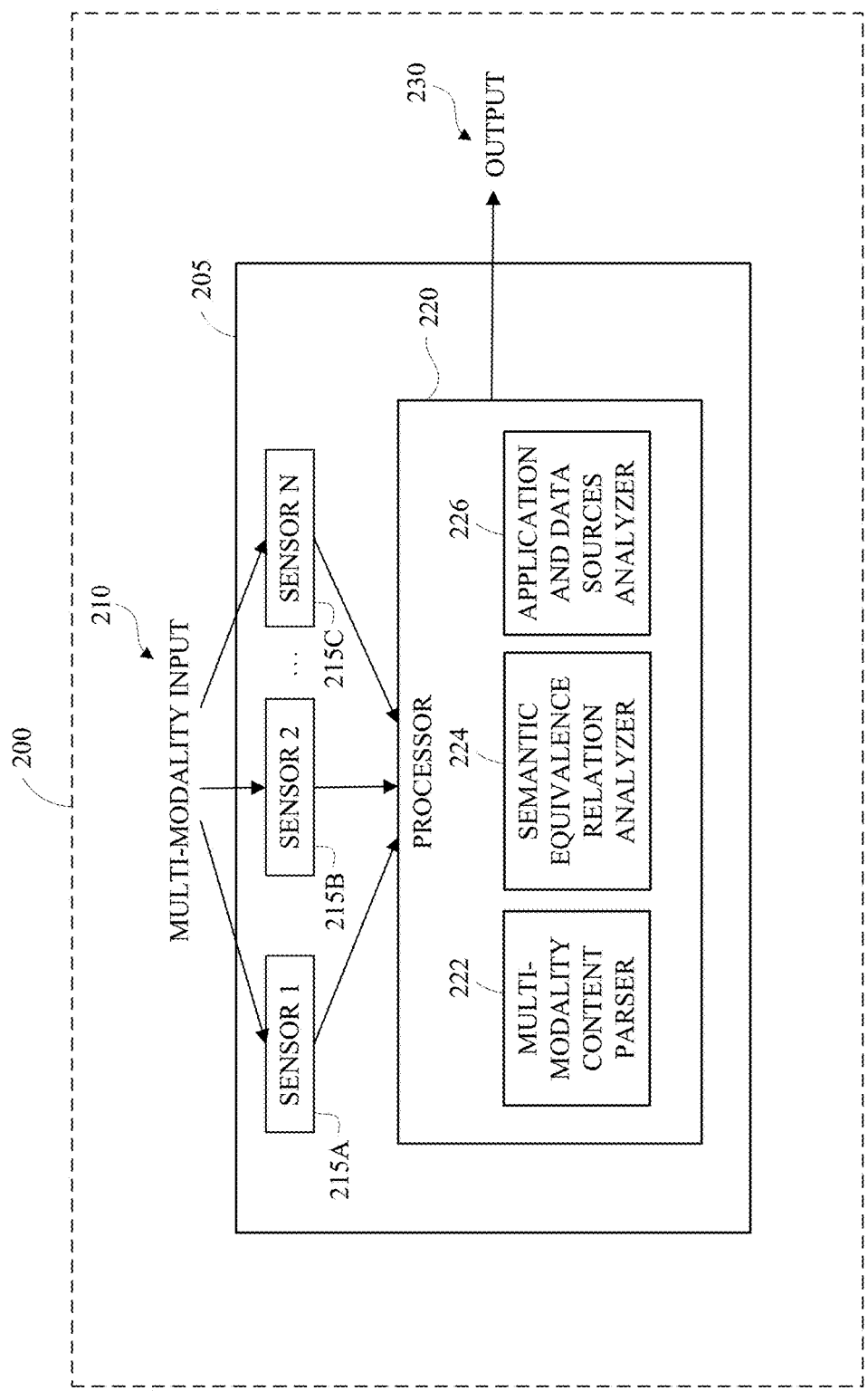
FIG. 2 is a block diagram of an example of a conversational virtual assistant system in accordance with embodiments of this disclosure.

FIG. 2 is a block diagram of an example of a conversational virtual assistant system 200 in accordance with embodiments of this disclosure. In this example, a computing device 205 may include a processor 220. The processor 220 may be a multi-modal processing component. In some embodiments, the processor 220 may be implemented with a soft-agent. The soft-agent may be a software component that is configured to allow users to provide inputs via a multi-modality interface. The processor 220 may include a multi-modality content parser 222, a semantic equivalence relation analyzer 224, an application and data sources analyzer 226, or any combination thereof. Computing device 205 may be configured to receive a multi-modality input 210, for example via a multi-modal interface. The multi-modality input 210 may be obtained by one or more sensors 215A-215C. Any number of sensors may be implemented, and three sensors are shown in FIG. 2 for simplicity and clarity. The one or more sensors 215A-215C may be any type of sensor including, for example, an interactive touch display, a microphone, a global positioning system (GPS) sensor; an accelerometer, or a biometric sensor. In an example, sensor 215A may be a microphone, sensor 215B may be an interactive touch display, and sensor 215C may be an accelerometer.

The multi-modality input 210 may comprise free-form text input in the form of a question or a statement. Alternatively, or in addition to, the multi-modality input 210 may comprises audio input such as speech or voice input, some other form of multi-modality input such as an image, video, touch, scanned object, gesture, or any combination thereof. In an example, the computing device 205 may be configured to processes the multi-modality input 210 using the processor 220 by a soft-agent to produces an output 230. Output 230 may include, for example, a search query that can be sent to a web data store stored on one or more other computing devices (not shown) for processing. Alternatively, processing of search queries may be performed by the processor 220 of the computing device 205. As another example, the output 230 may include a display of ordered search results obtained in response to a search query. The output 230 may include a multi-modality output that includes a display for an interactive dashboard, a text-to-speech audio output, an audible or haptic alert or notification, or any combination thereof. The audio output may be transmitted via any transmitter, including, for example, a speaker (not shown).

When a user is registered with the conversational virtual assistant system 200, the application and data stores that are allowed by the user are configured for accessing and retrieving information from those applications and data stores. The conversational virtual assistant system 200 may be configured to provide different user-access permission depending the user role and entitlements. Access to specific application and specific data stores is given to a user based on the user roles. When a new user is registered, the administrator may configure the access permission as per the user role, which enables the user to access the applications and data stores that are allowed for that specific role. Once the administrator approves the permissions, the user may access and retrieve the information from the allowed applications and data sources. One or more roles may be assigned to a user.

Figure 3:
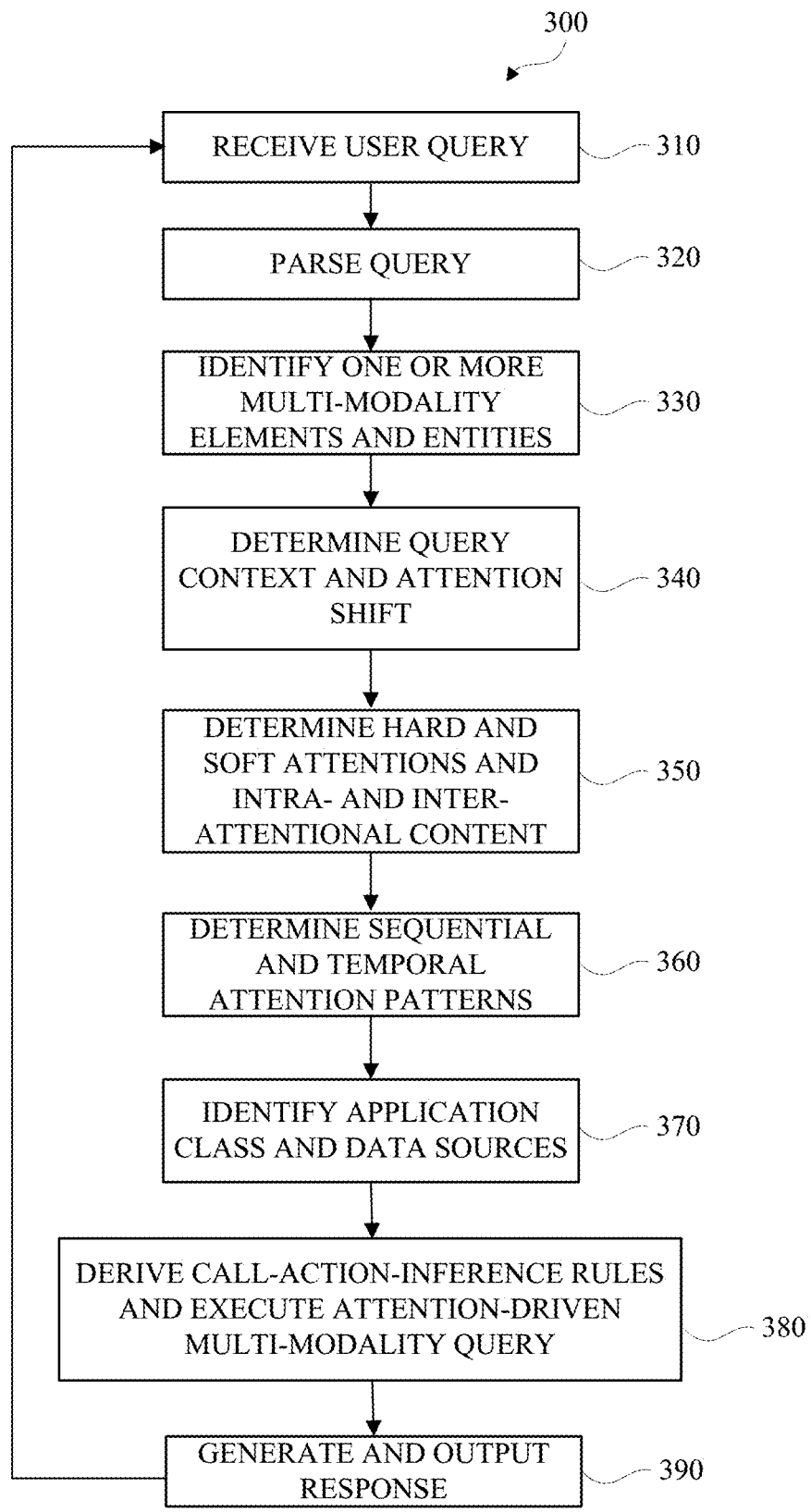
FIG. 3 is a flow diagram of an example of a method for processing a multi-modal conversation in accordance with embodiments of this disclosure.

FIG. 3 is a flow diagram of an example of a method 300 for processing a multi-modal conversation in accordance with embodiments of this disclosure. The method 300 may be performed by a multi-modality conversational assistant (MMCA) that is implemented in a machine-accessible and readable medium that is accessible over a network. The MMCA may be implemented on processor 102 shown in FIG. 1 or processor 220 of FIG. 2, for example. The network may be wired, wireless, or a combination of wired and wireless. In this example, a user may ask questions using an MMCA interface in the form of a multi-modality query and the system provides an output.

As shown in FIG. 3, the method 300 includes receiving 310 one or more user queries. The one or more user queries may form multi-modality inputs to provide an output, according to an example embodiment. The multi-modality input may include one or more inputs received via a multi-modal user interface, for example a graphical user interface with advanced user experience services, a touch interface, a gesture interface, a gaze interface, a microphone, an accelerometer, a GPS sensor, a biometric sensor, or any combination thereof.

The method 300 includes parsing 320 the one or more user queried (i.e., query content) using a multi-modality content parser such as the multi-modality content parser 222 shown in FIG. 2. The multi-modality content parser 222 is configured to parse the query content to produce parsed multi-modality content at different levels of granularity. For example, the multi-modality content parser 222 may use a natural language processing (NLP) parser and parts-of-speech tags for text content, and parse video content and detect objects in the video or segments of the video using computer vision techniques, machine learning (ML), AI, or the like.

The method 300 includes processing the multi-modality parsed content to identify 330 one or more multi-modality elements. The elements involve generating entities and relationships between the entities. The entities in the multi-modality parsed content include text data, image data, speech data, touch data, or any combination thereof. Examples of text data entities may include a word, text phrase, person names, item names, locations, events, and the like. Examples of image data entities may include a person, face, an object, scene, facial expression, body language, or the like. Examples of speech data entities may include tone, pitch, timbre, or the like. An example of a touch data entity may include a place on a map that is indicated by a user touching the map on an interactive display. The entities may be referential entities, such as "this," "first one," "here," for example, that indicate a reference in speech, text, or an image. An element refers to the portion of the multi-modality parsed content that is useful to identify the entities and also to identify the relationships across the identified identities. An example of a relationship is between "first one" and "red myPhone," as will be detailed further in FIGS. 4A and 4B. Identifying 330 on or more multi-modality elements may include semantic parsing among the multi-modality content.

The method 300 includes determining 340 query context, attention shift, or both. The context of the query may be drawn from past queries in the conversation and may also be based on an identified class of applications. For example, if the user query includes a date, the identified class of applications may include a calendar application. If a past query in the conversation included a birthday, the context may infer that the date in the user query is a birthday. The system may determine an attention shift with reference to previous queried while preserving the context. An attention shift may be determined by analyzing the conversation and user interaction with the application database that is configured to store the current action or topic being handled. A change in the current action or topic is identified as an attention shift. If the system determines that there is a change in the current action or topic, the current action or topic is updated.

The method 300 includes determining 350 hard and soft attentions of the user query and intra-attentional content and inter-attentional content. The hard attention may be directly inferred from the multi-modality input, and the soft attention may be inferred from the semantic relationships between some components, entities, or both. The system may use the semantic equivalence relation analyzer 224 shown in FIG. 2 to determine a semantic equivalence relation to identify the soft attentions. The semantic equivalence relation is a relation between semantically related representations where two different representations from different modalities contain relationship with reference to a defined concept. The intra-attentional content and inter-attentional content may include one or more multi-modality elements based on the query context.

The method 300 includes determining 360 sequential and temporal stream patterns in the conversation where the conversation includes multiple queries and responses having different contexts. The attentions may also include multi-turn attentions extracted from user-specific turns in the conversation, where user-specific turns refer to when the user is speaking or inputting multiple mode data during the conversation.

The method 300 includes identifying 370 application class and data sources. The application and data sources analyzer 226 shown in FIG. 2 is configured to identify one or more pre-defined applications and enterprise data sources as well as public data sources, for example, to query a weather data.

The method 300 includes deriving 380 call-action-inference rules and executing an attention-driven multi-modality query. The system may derive the call-action-inference logic based on the identified class of applications and data sources within the query context. The actions may be identified by the determined attention elements and generates an inference of an outcome if that action is performed. For example, when phone color is an attention element, then the call-action-inference identifies different colors available with the linked data source, and the inference to provide the phones which are as per the interest of the user captured from a previous interest along with color.

The method 300 includes generating 390 a response and outputting the response. Generating and outputting the response may include providing one or more responses resulting from the execution of the multi-modality query by inferring one or more call-action-inference rules. In an example, the system may receive a next question based on the responses provided at 390 for further analyzing the conversation and processing the successive queries of that conversation.

Figure 4A:
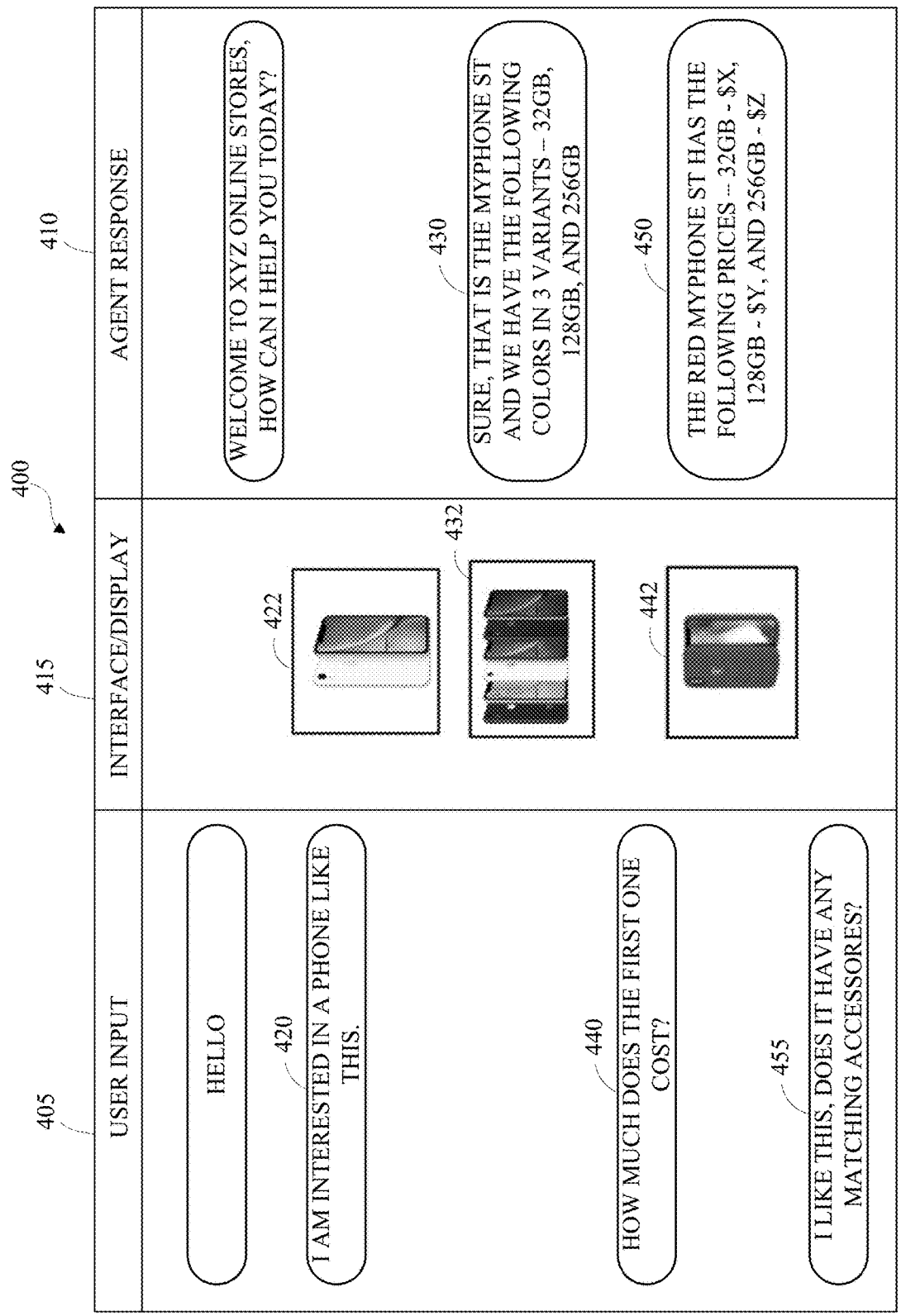
FIGS. 4A and 4B illustrate an example multi-modal conversation in accordance with embodiments of this disclosure.
Figure 4B:
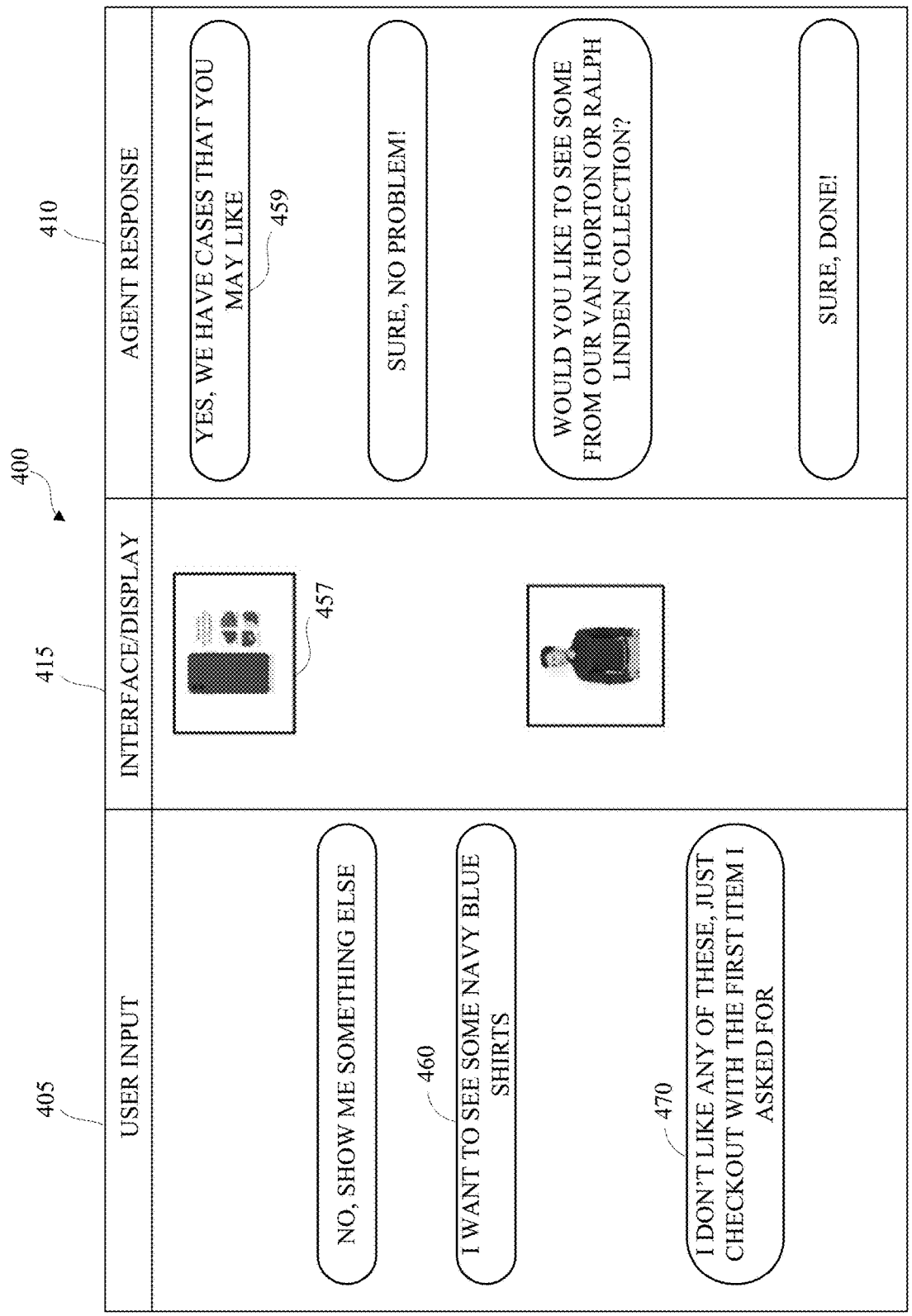

FIGS. 4A and 4B illustrate an example multi-modal conversation 400 in accordance with embodiments of this disclosure. As shown in FIGS. 4A and 4B, the multi-modal conversation 400 includes a user input 405, an agent response 410, and an interface/display 415. The user input 405 may include a speech input, a text input, a touch input, a gaze input, a gesture input, or any combination thereof. Sensors to obtain the user input 405 may include, and are not limited to, a touch display, a camera, a proximity sensor, a LIDAR sensor, or any combination thereof. The agent response 410 may be a speech response, a text response, or both.

In this example, a user may say "I am interested in a phone like this" 420 and point to an image 422 on the interface/display 415. Pointing to the image 422 may include a touch input, a gaze input, a gesture input, or any combination thereof. The agent may respond with a text and/or speech response 430 and display an image 432 on the interface/display 415. The image 432 may be associated with the text and/or speech response 430, and in this example, may show the phone in available colors. The user may then ask "How much does the first one cost?" 440. The agent determines that the first phone shown in image 432 is red and displays image 442 and provides a text and/or speech response 450. The conversation may then continue between the user and the agent and the user may inquire about matching accessories 455 and the agent may provide an image 457 and a text 459 in response.

In this example, the user may suddenly change the topic by saying "I want to see some navy blue shirts" 460. This sudden change in topic produces an attention shift. An attention shift may be determined by analyzing the conversation between the user and the conversational agent, and how the user interacts with the application database that provides the ability to store the current action or topic. In this example, the conversational agent determines that the user has returned to the original topic based on the user response 470. The conversational agent is configured to retrieve the products shown from a memory, and the temporal aspect in which they were shown. The conversational agent is configured to identify phrases such as "this," "first one," and the like, that form a basis for determining the attention and analyze the attentions. The attentions may be hard-attentions or soft-attentions. Hard-attentions may be extracted directly from the multi-modality content, such as text, image, video, speech, or any combination thereof. Soft-attentions may be derive based on the semantic relationships among the multi-modality inputs. For example, in the user input 420, the hard-attention would be "phone," whereas the soft-attention is the image 422 referred to by "this" in the user input 420.

Once the attentions are derived, the call-action-inference rules may be triggered. With reference to the example multi-modal conversation 400 above, an example call may be a function call to access phone data, sales data, and feedback data store. An example action may be to filter the data with "red" and "myPhone," and list the available models. An example inference may be that the user is looking for branded phones with a smart look and feel. Semantic equivalence and other methods may be applied to identify the type of query being posed and determine the intent. The query may be transmitted to the database to retrieve the entities and the respective fields, with the image, if available. The respective fields refer to one or more attributes associated with the entities. For example, a smart phone entity may have attributes that include color, size, camera type, memory size, and so on. A corresponding response may be generated and provided to the user.

Figure 5:
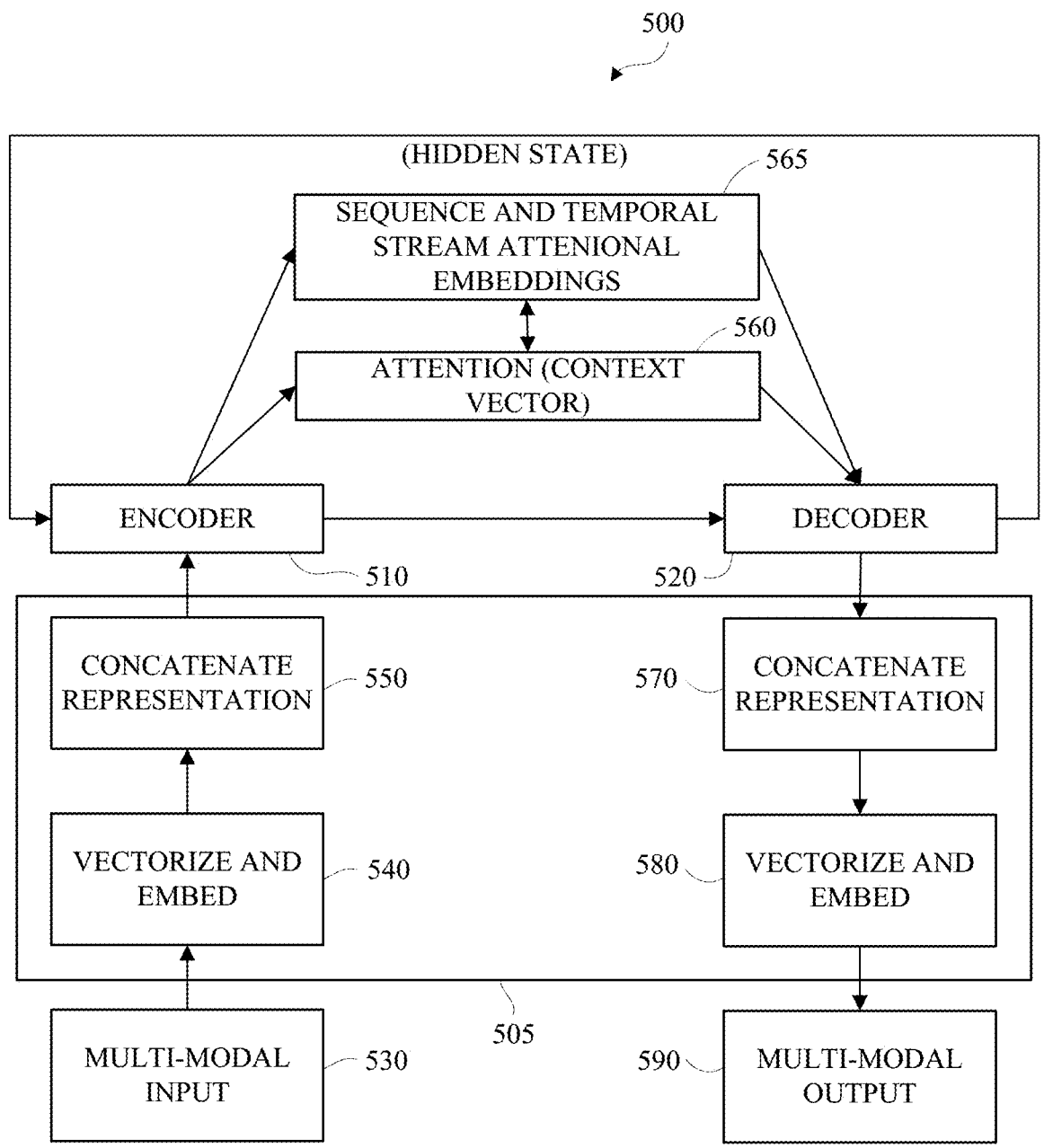
FIG. 5 is a block diagram of an example system configured to determine the attention from an image in accordance with embodiments of this disclosure.

FIG. 5 is a block diagram of an example system 500 configured to determine the attention from an image in accordance with embodiments of this disclosure. As shown in FIG. 5, the system 500 includes a processor 505, an encoder 510, and a decoder 520. The system 500 may be included in a single device or portions of the system may be included in multiple devices. An example of processor 505 may include the processor 102 shown in FIG. 1 or processor 220 of FIG. 2. In some implementations, the decoder side may have a separate processor than the encoder side.

As shown in FIG. 5, the multi-modal input 530 may be of any multi-modal format such as text, image, speech, video, body language, touch, facial expression, eye gaze, or any combination thereof. The processor 505 is configured to receive the multi-modal input 530 as sensor data in each modality. The processor 505 is configured to vectorize and embed 540 the multi-modal input 530 with contextual data. The contextual embeddings may be used for vectorizing the multi-modality input 530, with the help of techniques drawn from NLP (e.g., padding more bits) and image processing, and the like to ensure uniformity. For example, an image may be encoded using a 4096 dimensional representation obtained from the fully connected (FC)-6 layer of a 16 layer visual geometry group (VGGNet)-16 architecture. The embeddings may be any form of representation of the data, and are described here in the form of vectors as an example.

The processor 505 is configured to concatenate 550 the vectorized inputs in a prescribed format, such as textual embeddings first and image encodings next and so on, for example. The processor 505 is configured to concatenate 550 representations for each multi-modality input. The concatenated representations for each multi-modality input may then be input into a hierarchical layer encoder such as encoder 510. The encoder 510 may be a bidirectional gated recurrent unit (GRU) that is configured to determine the attention 560 in the multi-modal input 530. In an example, the attention may be a context vector. The encoder 510 may include an encoder model that is configured to learn the semantic relationships present in a given multimodal conversational input such as a sentence, text, query, gesture, speech, gaze, image, video, or any combination thereof. The encoder 510 is configured to extract the hard and soft attention from the determined attention to determine which portion of the multi-modal input 530 should be weighted to obtain an improved understanding of the input query.

As shown in FIG. 5, the system 500 is configured to capture 565 one or more sequence attentions from the sequence embeddings of the query in execution. In addition, the system may be configured to capture the temporal regularities and patterns from temporal embeddings in the multi-modality queries as the conversation progresses, for example, by incrementally updating the sequence of sequence stream patterns and temporal stream patterns. In some examples, the system 500 may be configured to implement one or more learning models. In one exemplary model, a hybrid of Convolutional Neural Networks (CNN)s and Bi-Gated Recurrent Unit (Bi-GRUs) may be used to determine the sequence and temporal stream patterns. The attention 560 over the sequence and temporal stream patterns may enable both sequence and temporal information while learning the embeddings. Enabling the sequence and temporal information includes understanding, identifying, and capturing the sequence and temporal information. Further, the model may extract CNN features and train Bi-GRU encoders to learn the contextual information of the multi-modality query and map both the sequence and temporal streams into a fixed-length context vector representation.

On the decoder 520 side, the hidden state and the output of the encoder may be used with the help of the attention 560 to obtain a multi-modal output. The temporal aspect may be maintained since the decoder hidden state from one message is transferred as an input to the next stage. The decoder 520 may be configured to perform the opposite function of the encoder having the same structure. The decoder 520 may be configured to map the state into an input which is of the concatenated format. The decoder state may be passed as an input to the next encoder state, thereby chaining consecutive encoder-decoders to ensure continuity in the conversation.

The decoder 520 is configured to input one or more decoder states to the processor 505. The processor is configured to concatenate the decoder states to obtain a concatenated representation 570. The concatenated representation 570 may be the same as the concatenated representation 550, except that it may be in the form of a response rather than a query. The concatenated representation 570 may be vectorized and embedded 580 to split into the respective modes and converted into a response comprising one or more multi-modality outputs 590 to the conversational query. Depending on the number of modalities present in the input query, additional convolution layers may be added between the encoder and the concatenated representation level on one side and between the decoder and the same on the other side for learning.

The decoder 520 may receive the same feature maps and the hidden vector from the previous iteration, which correspond to the image as a whole and the previous state of the decoder 520, and may lead to confusion within the decoder 520 while decoding the features. The system 500 is configured with an attention mechanism that ensures that the decoder 520 determines which part of the feature map it should focus on while generating a multi-modality content (e.g., word or phase in the text, face in an image, etc.). An attention system model may aid in determining which part of the encoded vector corresponds to each element in the input while training and how to use the relevant information to select the attention content while testing. These two processes may be referred to as align and translate.

Figure 6:
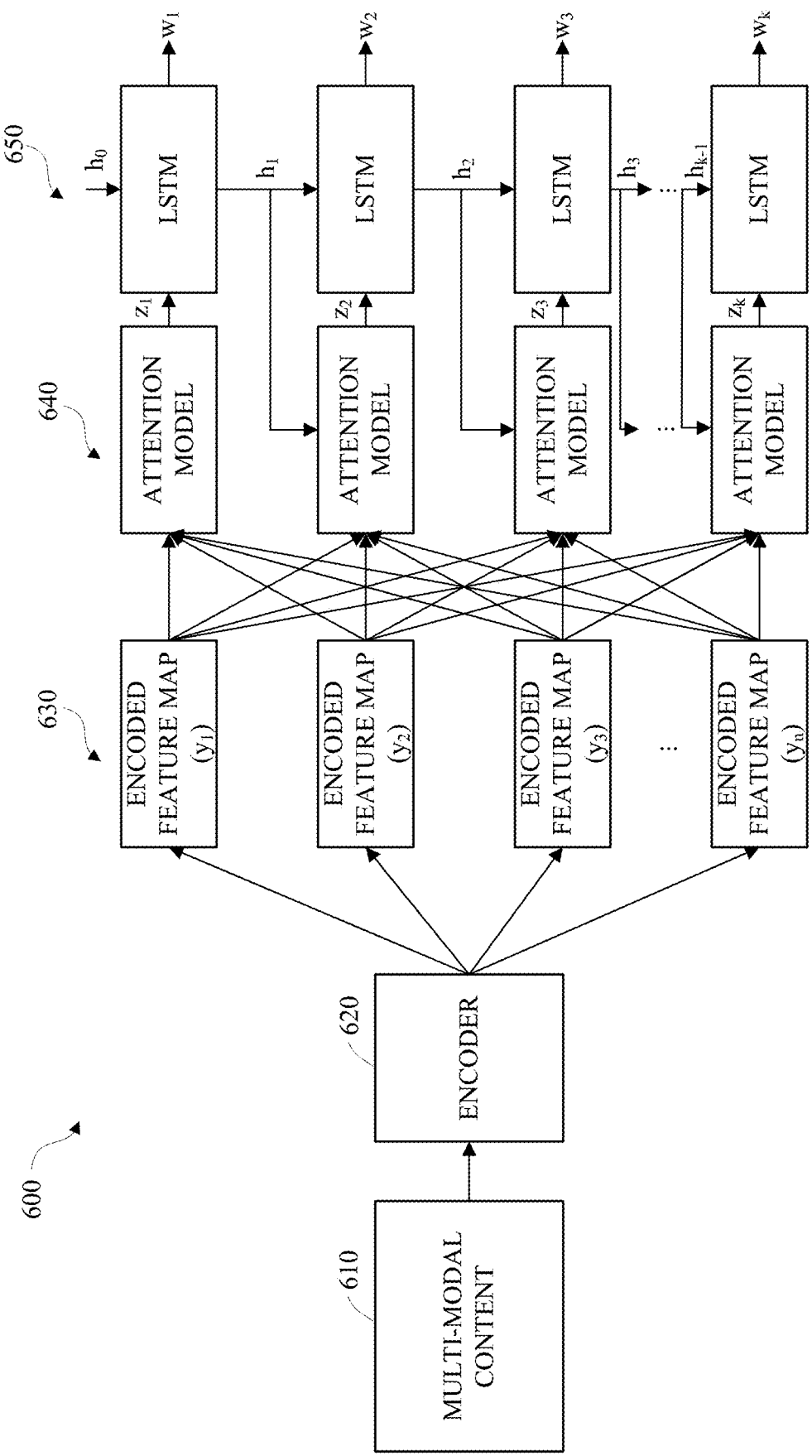
FIG. 6 is a diagram of an example of an attention system model in accordance with embodiments of this disclosure.

FIG. 6 is a diagram of an example of an attention system model 600 in accordance with embodiments of this disclosure. The attention system model 600 may be implemented in a system such as system 500 shown in FIG. 5. As shown in FIG. 6, multi-modal content 610 (e.g., text, image, speech, etc.) is captured via one or more sensors from a multi-modal conversational query provided by a user. The multi-modal content 610 may be input into an encoder 620. The encoder 620 may be an Inception V3 encoder, for example. The encoder 620 is configured to encode feature maps. The processor 505 shown in FIG. 5 may identify the number of feature maps n 630, for example ($y_1$, $y_2$, $y_3$ . . . , $y_n$), which corresponds to the dimension of the embedding which may be 256 in an example case. The feature maps 630 may be processed through a CNN denoted as attention models 640, to focus on the relevant parts of the encoded feature map and produce a context vector for each output time step (every content generated). A time step is a single occurrence of the cell. In a recurrent neural network (RNN) or a long-short term memory (LSTM) network, there may be multiple repetitions of the same cell. For inferencing, the output of a cell at a first time step is input to the same cell at a second time step, and continues in this pattern until a predetermined number of repetitions is completed. In a typical encoder-decoder network without attention, a constant fixed length context vector is used to generate every content. However, due to the attention model 640, a variable context vector is used in every time step to reflect relevant information corresponding to each content and the previous hidden state of the decoder. The variable context vector may be a context vector of varied size.

At 650, a decoder, such as decoder 520 shown in FIG. 5, obtains the output from the attention models 640. The output from the attention models 640 include the context vector $z_t$, the hidden state $h_t$ and the previous word $w_{(t-1)}$. The decoder 520 is configured to use the output of the attention models 640 to predict a word $w_t$ in the time step t. The decoder 520 may be configured to identify the user intent by determining a sequence of the inputs. For example, historical data (i.e., conversations) with labeled intents may be used for training natural language processing (NLP), computer vision (CV), and ML models for modeling the intent behavior. One or more of a Named Entity Recognition, Long Short Term Memory (LSTM), Support Vector Models (SVM) may be used to identify the user intent. The Name Entity Recognition may be used for identifying the entities in the text portion of the query. LSTM may be used for modeling the sequence portion of the query. SVM may be used for object detection and recognition in images, videos, or both.

A mechanism $\phi$ may be used to compute the context vector $z_i$ from the encoded vectors ($y_1$, $y_2$ . . . , $y_n$) which correspond to features extracted from different locations or parts of the one or more multi-modal inputs (e.g., image). For every location i, the mechanism $\phi$ computes an attention weight $\alpha_i$, which denotes the importance of that location. The attention weight $\alpha_i$ corresponding to each vector $y_i$ may be calculated using an attention mechanism denoted by $f_{(att)}$. This may be performed by using the hidden vector from the previous state $h_{(t-1)}$.

$$e_{(ti)} = f_{(att)}(y_i, h_{(t-1)}) \qquad \text{Equation (1)}$$

$$\alpha_{(ti)} = \frac{\exp(e_{(ti)})}{\sum_{k=1}^{n} \exp(e_{(tk)})} \qquad \text{Equation (2)}$$

After computing the attention weights, the context vector is computed as $$z_t = \phi(y_i, \alpha_i) \qquad \text{Equation (3)}$$

Given the set of encoded vectors and their attention weights, $\phi$ produces a single vector $z_t$. The embodiments disclosed herein may compute the attention weights in two ways: (a) hard attention and (b) soft attention.

In an example, let $s_{(t,i)}$ denote the location that the attention system model 600 selects to analyze while generating the content $w_t$ in the time step t. The variable $s_{(t,i)}$ may be a one-hot variable which is set to 1 if the model considers $y_i$ to extract the multi-modality features. One-hot is a representation of data, and may also be referred to as one-hot encoding. For example, if a variable "color" contains values such as red, green, and blue, then the one "color" column may be represented in three columns—one column for each value where a zero (0) or one (1) is placed in the row based on the color value in the original data. Hard attention, for example in the case of image data, may use a multinomial distribution parameterized by $\alpha_i$ to sample whether location $y_i$ is selected, which is reflected in the value of $s_{(t,i)}$. Here, $\alpha_i$ functions at the sample rate:

$$p(s_{(t,i)}=1|s_{(j<t)},y)=\alpha_{(t,i)} \quad \text{Equation (4)}$$

$$z_t = \Sigma s_{(t,i)} * y_i \quad \text{Equation (5)}$$

The Monte Carlo method may be used in backpropagation to ensure that the gradient descent occurs correctly. The Monte Carlo method performs end-to-end episodes to calculate an average for all sampling results. A Monte Carlo based sampling approximation of the gradient with respect to the model parameters may be used. Using this method, one or more locations in the encoded vectors $y_i$ may be allotted a weight $s_{(t,i)}$ in the time step t where the value of $s_{(t,i)}$ is sampled from a multinomial distribution parameterized by $\alpha_i$.

In the another exemplary model, the attention weights $\alpha_i$ corresponding to each location $y_i$ may be computed using a weighted vector, $$\phi(\{y_i\},\{\alpha_i\})=\Sigma_{i=1}^{n}\alpha_i * y_i \quad \text{Equation (6)}$$

Since the whole model is differentiable and smooth under deterministic attention, end-to-end training can proceed as normal by using standard backpropagation. Since soft attention is being computed, the variable $s_{(t,i)}$ is not one-hot anymore. Instead, the variable $s_{(t,i)}$ represents the attention score corresponding to a location $y_i$ in the time step t, $$s_{(t,i)}=\tanh(W_c h_{(t-1)}+W_y y_i) \quad \text{Equation (7)}$$

where $W_c$ is the weight considered for the previous hidden state (context) and $W_y$ is the weight considered for the input feature $y_i$ in the current state. These weights are application specific, and may be defined by the user. $W_c h_{(t-1)}+W_y y_i$ is a weighted linear combination of a feature $y_i$ and its previous state.

Then $s_{(t,i)}$ may be processed through a softmax normalization to compute the attention weight $\alpha_i$.

$$\alpha_i=\text{softmax}(s_{(t,1)},s_{(t,2)},\ldots,s_{(t,n)}) \quad \text{Equation (8)}$$

Due to the softmax normalization, the values of $\alpha_i$ may add up to a value of one. In this way the function $\phi$ may be calculated and the context vector $z_t$ may be produced for every time step t.

A similar procedure to the above may be performed for each type of multi-modality content. For example, to incorporate the facial expression features while generating the words, the pipeline may be modified to accommodate these features. In this example, the image features may be input to the attention model to obtain the attention weights and the context vector. The facial features may then be input to the attention model. A separate context vector may be created that emphasizes which locations of the face contribute to a word.

The context vector $z_t$, along with the previous hidden state $h_{(t-1)}$ and the previous content generated $w_{(t-1)}$ may be input to a decoder network that includes one or more decoders such as decoder 520 shown in FIG. 5 to generate the word $w_t$ in the time step t. The embodiments disclosed herein may use one or more recurrent neural networks (RNN)s and one or more GRUs to decode the context vector. The decoders may be configured to obtain the information learned from previous inputs from a memory and use this information to generate the next output. The context extracted from prior inputs and outputs may be represented by a hidden vector. Thus, the same input may generate a different output based on the previous hidden state. The network may include a multilevel encoder-decoder architecture using GRU as their building blocks.

Figure 7:
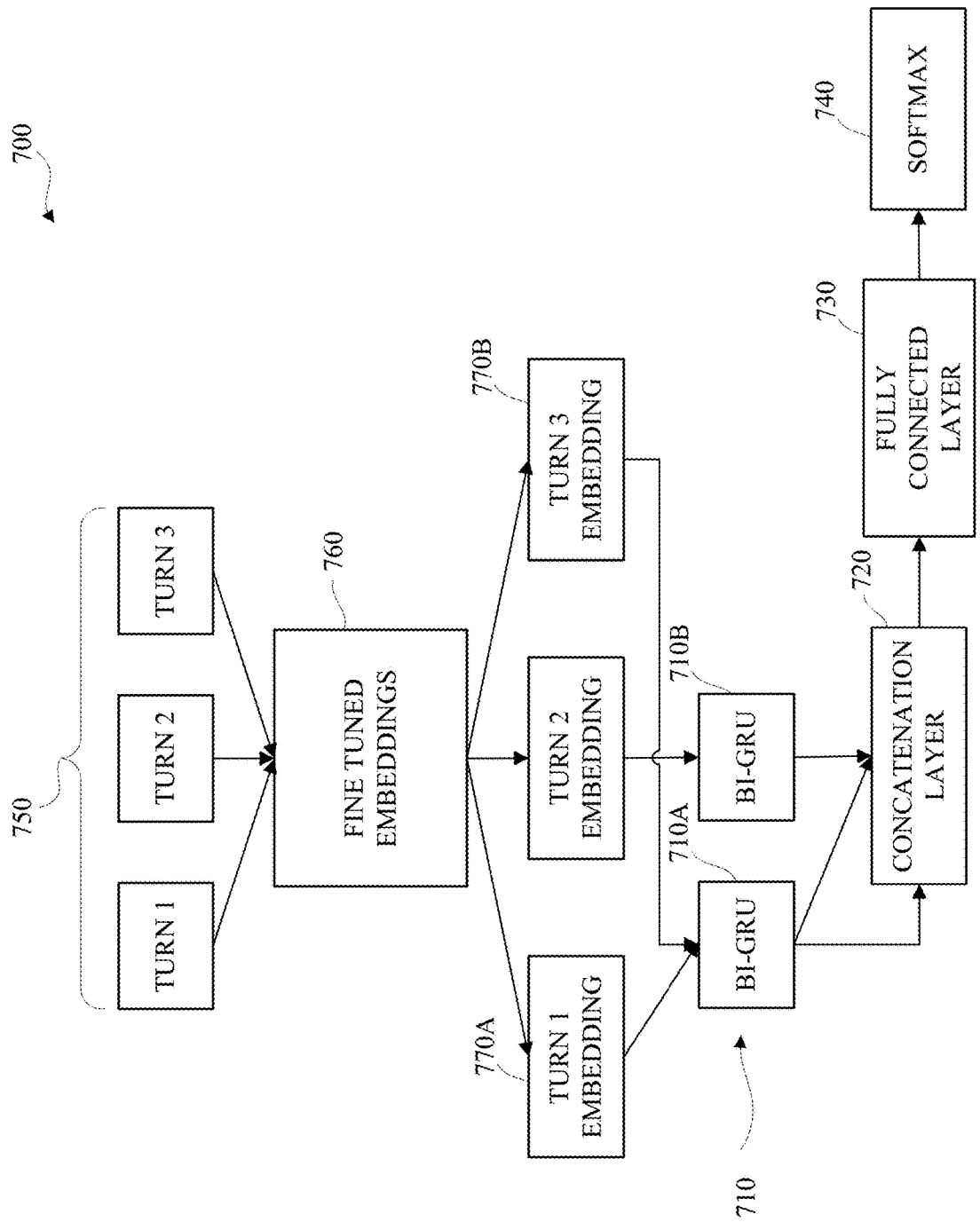
FIG. 7 is a block diagram of an example of a model architecture for analyzing multi-turn utterances in a conversation in accordance with embodiments of this disclosure.

FIG. 7 is a block diagram of an example of a model architecture 700 for analyzing multi-turn utterances in a conversation in accordance with embodiments of this disclosure. The model architecture 700 may include two or more Bidirectional Gated recurrent Units (Bi-GRUs) 710, a concatenation layer 720, a fully connected layer 730, and a softmax function 740. As shown in FIG. 7, the model architecture 700 is configured to obtain a conversation 750 using one or more sensors. In this example, the conversation 750 is between a user and a conversational agent and includes 3 turns in which turn 1 and turn 3 are utterances from the user and turn 2 is an utterance from the conversational agent. The model architecture 700 may be configured to create word embedding for text content using one or more word embedding techniques to obtain vectors and aggregating the vectors. The aggregation operation may be an averaging operation. For example, for a final vector size of 300, the embeddings of words may be generated by averaging the 300 dimensional word vectors using each of glove embedding, word2vec embedding and fasttext embedding; and fine-tuned embedding 760 trained on conversational dataset. In this example, three word embedding techniques are used to create a final vector size of 300, and it is understood that any number of word techniques may be used to create any sized final vector. Two Bi-GRUs are used in this example. A first Bi-GRU 710A is used for analyzing the utterances of the user (turns 1 and 3) and a second Bi-GRU 710B is used for analyzing the utterance of the conversational agent (turn 2). The user utterance (turns 1 and 3) may be input to the Bi-GRU 710A using pre-trained embeddings 770A and 770B, respectively. These three feature maps of each respective turn are output from the Bi-GRUs 710 and concatenated to form a flat feature vector. The concatenation layer 720 is configured to determine the relationship among the utterances of conversation, which is then passed to the fully connected layer 730. The fully connected layer 730 may be a fully connected hidden layer with 32 dimensions, for example. The output of the fully connected layer 730 may be passed to the softmax function 740 to predict the final class label. A regularization technique may be used to reduce the overfitting, and a dropout layer may be added at each Bi-GRU unit 710 and before the fully connected layer 730.

Figure 8:
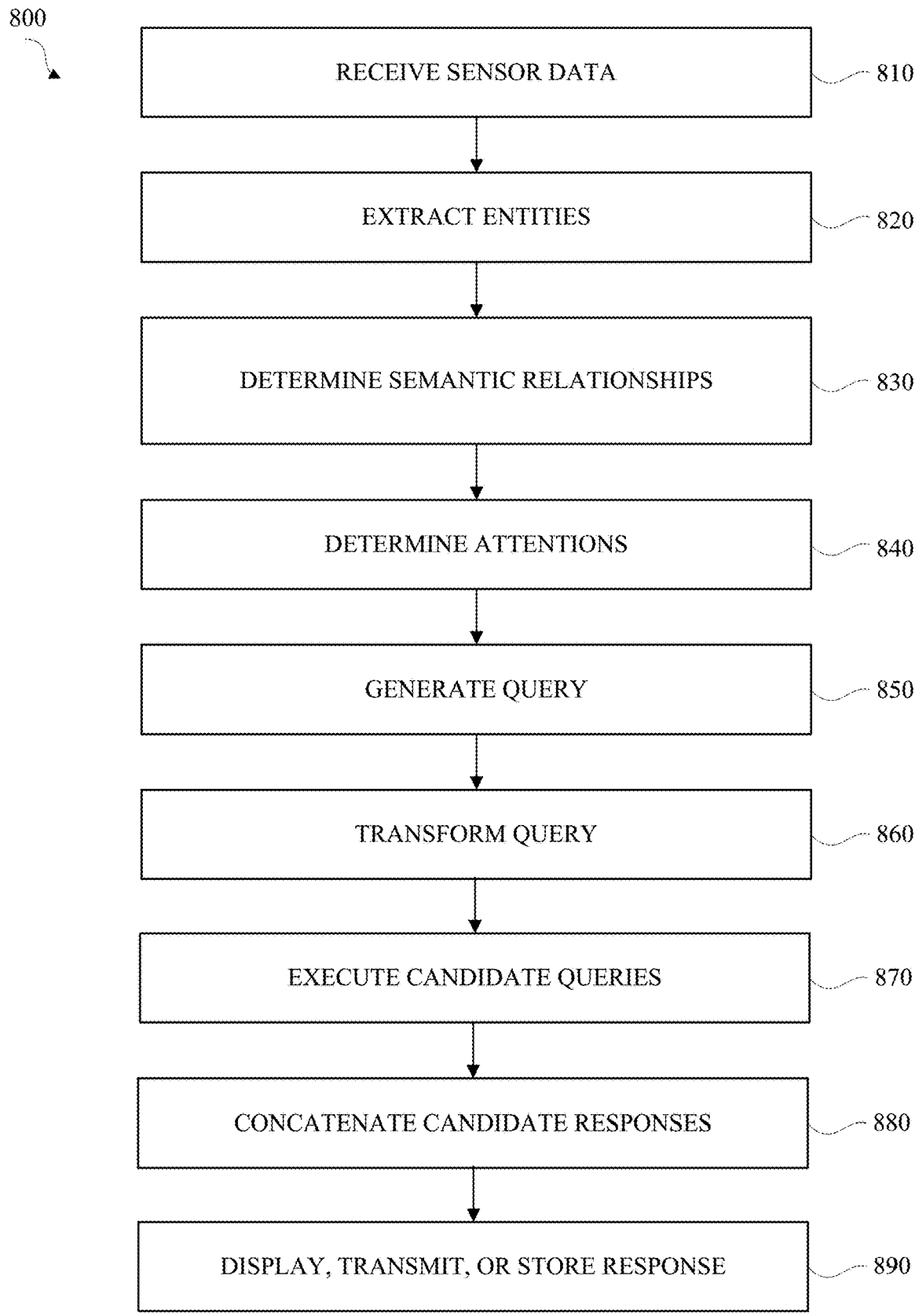
FIG. 8 is a flow diagram of another example of a method for processing a multi-modal conversation in accordance with embodiments of this disclosure.

FIG. 8 is a flow diagram of another example of a method 800 for processing a multi-modal conversation in accordance with embodiments of this disclosure. The method 800 includes receiving 810 sensor data. The sensor data may be received from one or more sensors. The sensors may include one or more of an interactive touch display, a microphone, a global positioning system (GPS) sensor; an accelerometer, a LIDAR sensor, or a biometric sensor. The sensor data may include a user request in multiple mode inputs, and each multiple mode input may be associated with one or more sensors. The user request may include a portion of a conversation. The multiple mode inputs may include at least one or more modalities including a voice input, an object drawing input, a scanned object input, a text input, an image input, a gesture input, a video input, a facial expression, an eye gaze, or a body language input.

The method 800 includes extracting 820 one or more entities. The one or more entities may be extracted in real-time. The one or more entities may be extracted from the multiple mode inputs. The method 800 includes determine 830 semantic relationships. The semantic relationships may be determined between the one or more entities. The semantic relationships may be determined by determining an attention spread for the candidate questions and candidate responses. In some examples, determining the semantic relationships may also include determining one or more sequence attentions, one or more temporal attentions, or both.

The method 800 includes determining 840 one or more attentions in the conversation and generating 850 a query based on the one or more attentions. Determining 840 the one or more attentions may include extracting one or more sequence attentions, one or more temporal attentions, or both, across one or more of the multiple mode inputs. Determining 840 the one or more attentions may include analyzing the one or more sequence attentions, the one or more temporal attentions, or both, through a sequence and temporal stream attentional encoder-decoder active learning framework, such as the system 500 shown in FIG. 5, to determine a context of the conversation. By analyzing the sequence and temporal attentions, the system 500 may build the attention-flow and determine the context vector (i.e., attention 560), where the attention-flow is the sequence of attentions modeled in the form of graphs where the attentional elements are nodes and attention movement within and across multi-modality queries as edges. This attention-flow may be used to discover attentional patterns, which in turn may be used for both attention tracking and attention shifts. Determining 840 the one or more attentions may include generating one or more events based on the context to determine one or more attention related multiple mode entities.

A call-action-inference pattern may be selected based on the one or more sequence attentions, the one or more temporal attentions, or both. The ambiguity across the one or more multimodality conversational elements may be resolved based on the context as well as hard attentions of the query that is in progress, soft attentions of the query that is in progress, or both. The features of the context may use semantic equivalence relationships to provide the evidence, reasoning, or both, for resolving one or more multimodality conversational elements. For instance, in the example "first one" related to a "Red myPhone", this is resolved with reference to conversation elements 430 and 455 in the example shown in FIGS. 4A and 4B. In one approach, the ambiguity resolution may be similar to a reference resolution. an attention shift may be determined from a sequence of the candidate queries to determine a corresponding class of application. A hard-attention element, a soft-attention element, or both may be generated based on one or more multiple mode inputs. In some embodiments, an intra-attentional content, an inter-attentional content, or both, may be generated from the one or more attentions.

The method 800 includes transforming 860 the query into candidate queries. The query may be transformed into multiple possible queries using technologies including, but not limited to, NLP, natural language understanding (NLU), speech and vision technologies, or the like. The relationships between these elements and candidate queries may be based on the semantic equivalence relationships. The method 800 includes executing 870 the candidate queries. The candidate queries may be executed against a respective data store and a respective application to generate candidate responses. The candidate responses are answers to the candidate queries. The method 800 includes concatenating 880 the candidate responses to generate a response based on the semantic relationships.

The method 800 includes one or more of displaying, transmitting, or storing 890 the response. The response may be displayed in an interactive dashboard. The response may be transmitted as an audio signal. The audio signal may be complementary to the displayed response. For example, the response may be displayed as text on the display and spoken as an audible response.

Having described and illustrated the principles with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein.

Elements of the described embodiments shown in software may be implemented in hardware and vice versa. As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine-readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory. Modules can be defined by executable code stored on non-transient media.

The following description is presented to enable a person of ordinary skill in the art to make and use the embodiments and is provided in the context of the requirement for a obtaining a patent. The present description is the best presently-contemplated method for carrying out the present embodiments. Various modifications to the embodiments will be readily apparent to those skilled in the art and the generic principles of the present embodiments may be applied to other embodiments, and some features of the present embodiments may be used without the corresponding use of other features. Accordingly, the present embodiments are not intended to be limited to the embodiments shown but are to be accorded the widest scope consistent with the principles and features described herein.

What is claimed is:

1. A method for processing a multi-modal conversation, the method comprising:
   receiving sensor data from a plurality of sensors by a computer system, wherein the sensor data comprise a user request in multiple mode inputs associated with the plurality of sensors, wherein the user request includes a portion of a conversation;
   vectorizing and embedding the multiple mode inputs with contextual data derived from an intra-query representation of the user request;
   concatenating the vectorized multiple mode inputs in a prescribed format;
   computing an attention weight using a gradient method to pass the vectorized multiple mode inputs,
   determining, based on the concatenated and vectorized multiple mode inputs and the attention weight, an attention in the conversation;
   identifying semantic relationships between one or more of the multiple mode inputs from the plurality of sensors;
   extracting one or more hard-attentions and one or more soft-attentions from the attention, wherein the one or more hard-attentions are directly extracted from the multiple mode inputs and the one or more soft-attentions are derived based on the semantic relationships;
   weighting, based on the one or more hard-attentions and the one or more soft-attentions, portions of the multiple mode inputs to determine a meaning of an input query wherein the weighting is based on the intra-query representation of the user request;
   generating the input query at least based on the weighted portions of the multiple mode inputs;
   determining one or more sequences attentions and temporal attentions for the input query and analyzing the sequence attentions and temporal attentions through a sequence stream and temporal stream attentional encoder-decoder active learning framework to determine a context of the conversation;
   identifying an application class and data sources based on the context;
   selecting a call-action-inference pattern based on the sequence attentions and temporal attentions;
   transforming the input query into one or more candidate queries;
   executing the one or more candidate queries against a respective data store and a respective application to generate candidate responses;
   concatenating the candidate responses to generate a response; and
   displaying the response in an interactive dashboard.

2. The method of claim 1, further comprising:
   determining temporal stream patterns and sequence stream patterns from temporal embeddings of the input query.

3. The method of claim 2, wherein the temporal stream patterns and the sequence stream patterns are incrementally updated.

4. The method of claim 1, wherein the multiple mode inputs include at least one or more modalities including a voice input, an object drawing input, a scanned object input, a text input, an image input, a gesture input, a video input, a facial expression, an eye gaze, or a body language input.

5. The method of claim 1, wherein determining the attention in the conversation comprises learning semantic relationships identified in the multiple mode inputs.

6. The method of claim 1, wherein generating the response based on the input query comprises using the attention to obtain multiple mode outputs.

7. The method of claim 6, wherein generating the response based on the input query comprises:
   receiving a feature map based on the input query; and
   determining, while obtaining the multiple mode outputs, which part of the feature map to focus on based on an attention mechanism.

8. The method of claim 1, wherein the gradient method weights attentions based on a location in the conversation.

9. The method of claim 8, wherein the location in the conversation is temporal.

10. A computing apparatus comprising:
    a processor;
    a plurality of sensors configured to obtain sensor data, wherein the sensor data comprise a user request in multiple mode inputs associated with the plurality of sensors, wherein the user request includes a portion of a conversation; and
    a memory configured to store instructions that, when executed by the processor, cause the computing apparatus to:
      receive the sensor data from the plurality of sensors,
      vectorize and embed the multiple mode inputs with contextual data derived from an intra-query representation of the user request;
      concatenate the vectorized multiple mode inputs in a prescribed format;
      compute an attention weight using a gradient method to pass the vectorized multiple mode inputs;
      identify semantic relationships between the multiple mode inputs from the plurality of sensors;
      determine, based on the concatenated and vectorized multiple mode inputs and the attention weight, an attention in the conversation;
      extract one or more hard-attentions and one or more soft-attentions from the attention, wherein the one or more hard-attentions are extracted directly from the multiple mode inputs and the one or more soft-attentions are derived based on the semantic relationships;
      assign, based on the one or more hard-attentions and the one or more soft-attentions, weights to portions of the multiple mode inputs to determine a meaning of an input query wherein the weights reflect the intra-query representation of the user request;
      generate the input query at least based on the weighted portions of the multiple mode inputs;
      determine one or more sequences of attentions and temporal attentions for the input query and analyze the sequence attentions and temporal attentions through a sequence stream and temporal stream attentional encoder-decoder active learning framework to determine a context of the conversation;
      identify an application class and data sources based on the context;
      select a call-action-inference pattern based on the sequence attentions and temporal attentions;
      transform the input query into one or more candidate queries;
      execute the one or more candidate queries against a respective data store and a respective application to generate candidate responses;
      concatenate the candidate responses to generate a response;
      and
      display the response in an interactive dashboard.

11. The computing apparatus of claim 10, wherein the temporal stream patterns and the sequence stream patterns are incrementally updated.

12. The computing apparatus of claim 10, wherein the multiple mode inputs include at least one or more modalities including a voice input, an object drawing input, a scanned object input, a text input, an image input, a gesture input, a video input, a facial expression, an eye gaze, or a body language input.

13. The computing apparatus of claim 10, wherein to determine the attention in the conversation comprises to:
  learn semantic relationships identified in the multiple mode inputs.

14. The computing apparatus of claim 10, wherein to generate the response based on the input query comprises to:
  use the attention to obtain multiple mode outputs.

15. The computing apparatus of claim 14, wherein to generate the response based on the input query comprises to:
  receive a feature map based on the input query; and
  determine, while obtaining the multiple mode outputs, which part of the feature map to focus on based on an attention mechanism.

16. A system comprising:
  a plurality of sensors configured to obtain sensor data by a computer system, wherein the sensor data comprise a user request in multiple mode inputs associated with the plurality of sensors, wherein the user request includes a portion of a conversation; and
  a processor configured to:
    receive the sensor data from the plurality of sensors;
    vectorize and embed the multiple mode inputs with contextual data derived from an intra-query representation of the user request;
    concatenate the vectorized multiple mode inputs in a prescribed format;
    compute an attention weight using a gradient method to pass the vectorized multiple mode inputs;
    determine semantic relationships between one or more entities extracted from the multiple mode inputs from the plurality of sensors;
    determine, based on the concatenated and vectorized multiple mode inputs and the attention weight, an attention in the conversation;
    extract one or more hard-attentions and one or more soft-attentions from the attention, wherein the one or more hard-attentions are directly extracted from the multiple mode inputs and the one or more soft-attentions are derived based on the semantic relationships;
    assign, based on the one or more hard-attentions and the one or more soft-attentions, weights to portions of the multiple mode inputs to determine a meaning of an input query wherein the weights reflect the intra-query representation of the user request;
    generate the input query at least based on the weighted portions of the multiple mode inputs;
    determine one or more sequences of attentions and temporal attentions for the input query and analyze the sequence attentions and temporal attentions through a sequence stream and temporal stream attentional encoder-decoder active learning framework to determine a context of the conversation;
    identify an application class and data sources based on the context;
    select a call-action-inference pattern based on the sequence attentions and temporal attentions;
    transform the input query into one or more candidate queries;
    execute the one or more candidate queries against a respective data store and a respective application to generate candidate responses;
    concatenate the candidate responses to generate a response;
    and
    display the response in an interactive dashboard.

17. The system of claim 16, wherein temporal stream patterns and sequence stream patterns are incrementally updated.

18. The system of claim 16, wherein the multiple mode inputs include at least one or more modalities including a voice input, an object drawing input, a scanned object input, a text input, an image input, a gesture input, a video input, a facial expression, an eye gaze, or a body language input.

19. The system of claim 16, wherein to determine the attention in the conversation comprises to:
  learn semantic relationships identified in the multiple mode inputs.

* * * * *